United States Patent
Pinto, IV et al.

(10) Patent No.: US 8,656,714 B2
(45) Date of Patent: Feb. 25, 2014

(54) METHODS OF ACTIVATING THERMALLY RESPONSIVE ACTIVE MATERIALS USING WIRELESS TRANSMISSION

(75) Inventors: Nicholas W Pinto, IV, Ferndale, MI (US); Paul W. Alexander, Ypsilanti, MI (US); Alan L. Browne, Grosse Pointe, MI (US); Nilesh D. Mankame, Ann Arbor, MI (US); Peter Maxwell Sarosi, Royal Oak, MI (US); Andrew M. Mance, Royal Oak, MI (US); Nancy L. Johnson, Northville, MI (US); Marten Wittorf, Ingelheim (DE)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 13/371,441

(22) Filed: Feb. 12, 2012

(65) Prior Publication Data
US 2012/0137672 A1    Jun. 7, 2012

(51) Int. Cl.
*F03G 7/06*    (2006.01)

(52) U.S. Cl.
USPC ........................... 60/527; 60/529; 160/6

(58) Field of Classification Search
USPC ......... 60/527, 528, 529; 160/1, 6, 7; 310/306, 310/307, 308; 337/123, 382, 393–396; 49/2, 25, 31
See application file for complete search history.

(56) References Cited

U.S. PATENT DOCUMENTS

| | | | | |
|---|---|---|---|---|
| 3,316,415 | A * | 4/1967 | Taylor | 290/1 R |
| 3,798,896 | A * | 3/1974 | Yang et al. | 60/527 |
| 3,830,060 | A * | 8/1974 | Jedlicka et al. | 60/527 |
| 4,010,612 | A * | 3/1977 | Sandoval | 60/527 |
| 4,281,513 | A * | 8/1981 | Johnson et al. | 60/527 |
| 6,129,181 | A * | 10/2000 | Weems | 185/37 |
| 7,367,186 | B2 * | 5/2008 | Clements | 60/527 |
| 7,444,812 | B2 * | 11/2008 | Kirkpatirck et al. | 60/528 |
| 2005/0091975 | A1 * | 5/2005 | Clements | 60/527 |
| 2005/0121240 | A1 * | 6/2005 | Aase et al. | 180/68.1 |
| 2008/0185936 | A1 * | 8/2008 | Panchapakesan et al. | 310/306 |

* cited by examiner

*Primary Examiner* — David Purol

(57) ABSTRACT

Actuation assemblies for and methods of activating a thermally actuated active material actuator utilizing wireless transmissions of energy.

18 Claims, 3 Drawing Sheets

METHODS OF ACTIVATING THERMALLY RESPONSIVE ACTIVE MATERIALS USING WIRELESS TRANSMISSION

CROSS-REFERENCES TO RELATED APPLICATIONS

This U.S. Non-Provisional patent application is related to U.S. Non-Provisional application Ser. No. 12/059,861 ("the '861 application") filed on Mar. 31, 2008, now U.S. Pat. No. 8,109,318 entitled METHODS OF DEPLOYING A COVER UTILIZING ACTIVE MATERIAL AND AN EXTERNAL HEAT SOURCE, and incorporated by reference herein.

BACKGROUND OF THE INVENTION

1. Field of the Invention

The present disclosure generally relates to methods of activating thermally actuated active materials, and more particularly, to methods of doing the same that utilize wireless transmission to enable, or directly cause activation.

2. Discussion of Prior Art

Thermally actuated active material (e.g., shape memory alloy, shape memory polymer, paraffin wax, etc.) actuators typically require hard-wire communication to effect on-demand activation. More particularly, in these systems an electric circuit comprising an input device or controller provides the electric current used to directly (e.g., through Joule heating) or indirectly (e.g., by energizing a neighboring thermal element) heat the actuator, wherein the device or controller is operable to control the current and activation signal. Needless to say, the necessity to provide hard-wire connection limits the scope and flexibility of the system, and presents other concerns. For example, it is appreciated that the distance between the input device or controller and actuator is limited by acceptable material costs, and the resistance within the circuit based on the available voltage, and that, as such, the presence of a user proximal to the actuator is required.

BRIEF SUMMARY

Responsive to these and other concerns, novel methods of actuating a thermally activated active material actuator utilizing a wireless transmission (i.e., a radiated form of energy) are presented herein. The inventive methods and actuator configurations are useful to effect on-demand activation without the use of an electric circuit. By using a wireless medium, the spacing between an input device or controller and the actuator may be vastly increased, thus, enabling remote activation. Finally, the invention is particularly useful for expanding the potential applications of thermally activated active materials. For example, the invention may be used to enable on-demand activation in hazardous environments where operator presence is not feasible, through solid materials, and during power outages.

In general, the invention concerns a method of activating a thermally actuated active material actuator, and includes the steps of producing a wireless transmission, and engaging a receptive element with the transmission. The element is communicatively coupled to the actuator, such that modifying the element as a result of engagement with the transmission, results in exposing the actuator to a heat energy activation signal. More preferably, the element is thermally coupled to the actuator and operable to produce the signal, as a result of engagement with the transmission. Accordingly, another aspect of the invention involves an actuation assembly suitable for use.

The above described and other features, including the various types of actuation assemblies, and receptive elements contemplated herein, are exemplified by the following figures and detailed description.

BRIEF DESCRIPTION OF THE DRAWINGS

Preferred embodiments of the invention are described in detail below with reference to the attached drawing figures, wherein.

DETAILED DESCRIPTION

Figure 1:
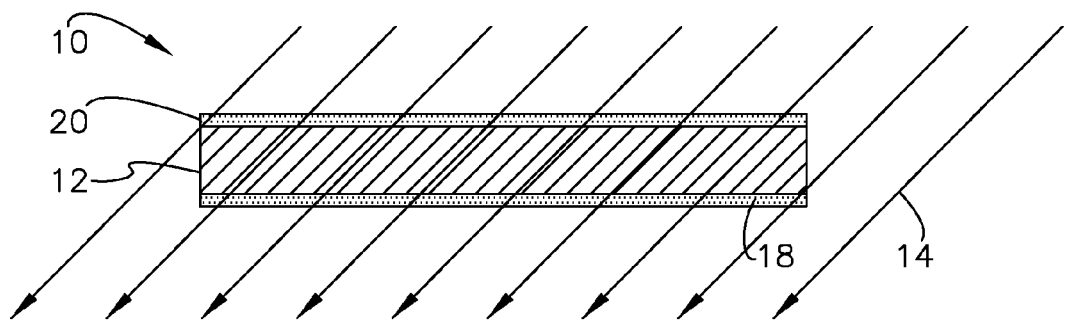
FIG. 1 is an elevation of an actuation assembly comprising a thermally activated active material actuator and receptive element forming an external layer or coating, wherein the element engages a wireless transmission, in accordance with a preferred embodiment of the invention.

Referring to FIGS. 1-5, the invention presents a novel thermally activated actuation assembly 10, and method of activating a thermally actuated active material actuator 12 that utilizes a wireless transmission 14 to effect activation. More particularly, the transmission 14 either enables, promotes, or directly causes activation. In general, the transmission 14 presents any radiated form of energy or fluid flow that is able to convey energy between a source 16 and the actuation assembly 10, other than passively generated thermal radiation sufficient for activation directly. By focusing on wireless transmissions 14, the present invention distinguishes from conventional actuation methodology that relies upon a neighboring exothermic system to passively generate the activation signal. As further described below and in the '861 application, however, solar thermal radiation insufficient to effect activation directly is contemplated for use herein as a transmission 14. It is appreciated that the transmission 14 may be selected from the full range of the electromagnetic spectrum, including gamma rays, X-rays, ultra-violet radiation, visible light, infrared radiation, microwaves, radio waves, and long waves.

The transmission 14 may be produced selectively (for example, as with respect to laser technology as further described below), so as to effect on-demand activation, or generated passively, e.g., as a by-product of a monitored system (not shown). Finally, it is appreciated that the transmission 14 may be directed, or omni-directional.

The term "actuator" as used herein, shall be used in a non-limiting sense, and includes active material sensors, or "smart" material configurations wherein the active material both senses and actuates a greater device, mechanism, or system (not shown). The invention in various examples is described herein without limitation, and is suitable for any application in which remote thermal active material actuation is desired, including sealed testing chambers, hazardous environments, aerospace, military, automotive, law enforcement, and food preparation applications. Where adapted for use with microwaves, for example, the assembly 10 may be used to actuate a mixing apparatus within a microwave oven, or to open a cover to a receiver during microwave communication. Further, in an automotive setting, it is appreciated that the present invention may be used to remotely disconnect battery power or a gas tank so that emergency responders are safer when responding to an accident scene.

I. Exemplary Active Material Morphology and Function

As used herein the term "active material" is defined as any of those materials or composites that exhibit a reversible change in fundamental (i.e., chemical or intrinsic physical) property when exposed to or precluded from an activation signal. Suitable thermally activated active materials for use with the present invention include, but are not limited to, those that have the ability to remember their original at least one attribute such as shape, which can subsequently be recalled by applying an external thermal stimulus, and include shape memory alloys (SMA's), shape memory ceramics, shape memory polymers (SMP's), high-volume paraffin wax, and the like.

Shape memory alloys generally refer to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. Generally, in the low temperature, or Martensite phase, shape memory alloys can be pseudo-plastically deformed and upon exposure to some higher temperature will transform to an Austenite phase, or parent phase, returning to their shape prior to the deformation.

Shape memory alloys exist in several different temperature-dependent phases. The most commonly utilized of these phases are the so-called Martensite and Austenite phases. In the following discussion, the Martensite phase generally refers to the more deformable, lower temperature phase whereas the Austenite phase generally refers to the more rigid, higher temperature phase. When the shape memory alloy is in the Martensite phase and is heated, it begins to change into the Austenite phase. The temperature at which this phenomenon starts is often referred to as Austenite start temperature ($A_s$). The temperature at which this phenomenon is complete is called the Austenite finish temperature ($A_f$).

When the shape memory alloy is in the Austenite phase and is cooled, it begins to change into the Martensite phase, and the temperature at which this phenomenon starts is referred to as the Martensite start temperature ($M_s$). The temperature at which Austenite finishes transforming to Martensite is called the Martensite finish temperature ($M_f$). Thus, a suitable activation signal for use with shape memory alloys is a thermal activation signal having a magnitude to cause transformations between the Martensite and Austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the Martensite to Austenite phase transformation, and the material will recover the original, annealed shape. Hence, one-way shape memory effects are only observed upon heating. Active materials comprising shape memory alloy compositions that exhibit one-way memory effects do not automatically reform, and require an external mechanical force to return the shape to its previous configuration.

Intrinsic and extrinsic two-way shape memory materials are characterized by a shape transition both upon heating from the Martensite phase to the Austenite phase, as well as an additional shape transition upon cooling from the Austenite phase back to the Martensite phase. Active materials that exhibit an intrinsic shape memory effect are fabricated from a shape memory alloy composition that will cause the active materials to automatically reform themselves as a result of the above noted phase transformations. Intrinsic two-way shape memory behavior must be induced in the shape memory material through processing. Such procedures include extreme deformation of the material while in the Martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effect are composite or multi-component materials. They combine an alloy that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the system with shape memory effects, superelastic effects, and high damping capacity.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

Thus, for the purposes of this invention, it is appreciated that SMA's exhibit a modulus increase of approximately 2.5 times and a dimensional change of up to 8% (depending on the amount of pre-strain) when heated above their phase transition temperature. It is appreciated that where the SMA is one-way in operation, a biasing force return mechanism (such as a spring) would be required to return the SMA to its starting configuration. Finally, it is appreciated that Joule heating can be used to make the entire system electronically controllable.

Thermally-activated shape memory polymers (SMPs) are polymers that exhibit the following properties. First, their elastic modulus changes substantially (usually by one-three orders of magnitude) across a narrow transition temperature range. Second, the temperature range can be adjusted to lie within a wide range that includes the interval 0 to 150° C. by varying the composition of the polymer. Third, there is a finite rubbery plateau in the elastic response at temperatures above the transition range where the modulus remains fairly constant.

In addition to the elastic modulus, properties such as permeability to moisture, and refractive index also exhibit a significant change across the transition temperature range. Shape memory polymers activated by other stimuli, such as light, and humidity, show a similar behavior wherein the change in properties occurs over a range of or corresponding to finitely separated discrete values of the specific stimulus. These properties are the result of morphology of the polymer which contains chains of atoms that are connected by two types of cross-links: irreversible and reversible. The latter can be broken by supplying sufficient thermal energy to raise the temperature of the polymer above the transition range in thermally-activated SMPs. In this condition, the chains in the polymer are held together only by the irreversible cross-links. Hence, the elastic modulus of the polymer is low and the material can be stretched to high strains (e.g. up to 300%). Due to a reduction in cross-links the polymer chains can move relative to each other by significant distances to accommodate the large strains without causing breakage of the reversible cross-links, and hence, without plastic failure. If this deformation is maintained while the polymer is cooled to a temperature below the transition range, the reversible cross-links are formed between the polymer chains in their new positions. The increased density of cross-links constrains the relative motions of the polymer chains and thus, increases the stiffness of the material. The newly formed reversible cross-links serve to lock in the deformation imparted to the polymer above the transition range.

Experiments have shown that the polymer can retain the deformed shape for extended periods of time (e.g., up to 6 months) as long as they are loaded within the elastic limit of the polymer below the transition range and the material temperature does not rise into or above the transition range. Subsequent heating of the polymer above the transition range causes the reversible cross-links to break, and if the material is free of external loads, to recover previously induced deformation above the transition range. The strain recovery is often nearly complete (e.g., 98% or more). Thus, SMPs can be imparted temporary shapes by deforming them above the transition range and cooling them below the transition range. The original shape can be recovered simply by heating the polymer above the transition range in the absence of external loads.

Depending on the nature of the polymer morphology a wide variety of SMPs can be formed. One way of classifying SMPs is based on the nature of the cross-links. The irreversible cross-links in thermoset SMPs are formed by covalent bonds. Thermoplastic SMPs do not have truly irreversible cross-links. They have two or more types of reversible cross-links that are formed and broken over finitely separated temperature ranges. Any of the temperature ranges across which the polymer behaves in the manner specified above can be treated as a transition range for the material. Typically, the lowest temperature range that falls within the range of normal operating conditions for the material is used as the transition range. When the material is heated above its transition range only the cross-links corresponding to this range and all lower ranges are broken. The cross-links that break and form at higher temperatures are unaffected, and play the role of irreversible cross-links in this class of SMP.

Reversible cross-links are secondary bonds that consists of H-bonds, ionic bonds, and van der Waals forces, which can cause linear chain molecules, especially those with the same tacticity and negligable pendant groups, to crystallize. Irreversible cross-links produce entanglement and covalent cross-links, and may be reversible for some photo-activated SMPs. The backbone may be a thermoplastic (i.e., basically a one-dimensional covalent network of linear molecules). The links in the backbone are not cross-links, but rather are links between non-adjacent atoms in the chain. Thus, instead of a one-dimensional network, a non-cross-linked network is presented that flows easily when heated above a softening temperature due to the one-dimensional nature, which promotes relative sliding between backbone chain segments. As such, the polymer can be reshaped easily by heating above a softening temperature.

In thermoset SMPs, a three-dimensional covalent network presents a cross-linked network that does not flow when heated. Instead it burns or chars above a characteristic temperature because the three-dimensional covalent network restricts the motion of backbone chain segments. As such, better structural properties, as well as heat and chemical resistance is provided. In thermoplastic SMPs, the original/permanent shape is set by physical cross-links produced by the hard segment; whereas in thermoset SMPs, there may be no hard segment. The permanent shape is set by forming covalent cross-links between the (soft) segments.

Thus, for the purposes of this invention, it is appreciated that SMP's exhibit a dramatic drop in modulus when heated above the glass transition temperature of their constituent that has a lower glass transition temperature. If loading/deformation is maintained while the temperature is dropped, the deformed shape will be set in the SMP until it is reheated while under no load under which condition it will return to its as-molded shape. While SMP's could be used variously in block, sheet, slab, lattice, truss, fiber or foam forms, they require their temperature to be above the glass transition temperature of their constituent that has a lower glass transition temperature, i.e. a continuous power input in a low temperature environment to remain in their lower modulus state.

II. Exemplary Assembly Embodiments, and Methods of Activation

Returning to the structural configuration of the present invention, the assembly 10 comprises an active material actuator 12 and receptive element 18 able to communicate with the transmission 14. An exemplary actuator 12 is shown in FIGS. 1-4 presenting a wire configuration that defines an external surface 12a. The term "wire" shall be used in a non-limiting sense, and includes strips, cables, braids, chains, or other equivalent tensile structures; moreover, it is appreciated that the inventive assembly 10 and method may be used with non-wire actuator configurations, such as sheets, meshes, three-dimensional structures.

The receptive element 18 is configured to enable, promote, or directly produce the activation signal, upon engagement with the transmission 14, and can take the form of a coating applied to the surface 12a, a surface treatment, an external layer adjacent the surface 12a, a fluid enveloping the actuator 12, a plurality of particles impregnated within the actuator 12, and preferably within a top layer of the actuator 12, or a molecular additive added to the actuator constituency. The coating and/or layer 20 (FIGS. 1-4) are preferably flexible/moldable, and configured to limit thermally activated transformation by responding faster or slower to the activation signal, resetting or cooling faster/slower, or reacting to the different energy bands being transmitted. Surface treatments 22 suitable for use include etching, abrasion, oxides, or polishing to induce similar effects to composite, layered, or a compositionally varied (i.e., graded) coating. Moreover, as used herein the term "surface treatments" shall include micro features, such as positive or negative surface features of a size and/or shape that results in the surface 12a becoming more or less sensitive to specific frequency signals, and large scale features, such as looping or spooling of an SMA wire 12.

In a preferred embodiment, the receptive element 18 is operable to change the emissivity, or otherwise heat transfer characteristics of the surface 12a, so as to selectively enable and/or promote activation. That is to say, the element 18 may cloak the surface 12a and be shiftable between first and second emissivities upon engagement with the transmission 14. The first emissivity is preferably ten, more preferably twenty-five, and most preferably fifty percent greater than the second. For example, the element 18 may present an external layer or coating 20 adjacent the surface 12a, that comprises a chromogenic material. More particularly, the element 18 may comprise a photochromic, thermochromic, electrochromic, or halochromic material, so as to be receptive to light, heat, electricity, or acidic content, respectively. Each of the above-mentioned transmissions 14 being operable to modify the color of the chromogenic element 18, so as to selectively enable an activation signal to pass through to the surface 12a. Thus, in this configuration, when activation is desired, the transmission 14 is produced or ceased, so as to modify the color of the coating or layer 18 to the more thermally absorbent (i.e., less reflective) state of the achievable colors.

To effect precision activation over long distances (wherein a sufficient line-of-sight is provided), a preferred embodiment of the invention employs a laser 16, and laser beam transmission 14 (FIG. 1a) to heat the actuator 12. The beam 14 may be transmitted parallel to the actuator 12 as shown in hidden-line type, where sufficiently adjacent. That is to say, where parallel, the beam 14 must be transmitted such that the actuator 12 is within its zone of thermal influence. More preferably, the transmission 14 includes a plurality of beams 14a-c (FIG. 1a) oriented to engage the actuator 12 at multiple locations or from multiple sides, so as to promote more uniform heating. The beams 14a-c are preferably split from a single source 16 as shown continuously in FIG. 1a. As shown in FIG. 1, for example, the beams 14a-c preferably engage the actuator 12 at an angle, and more preferably, at an angle approaching ninety degrees, so as to increase the contact surface area of engagement.

Figure 1A:
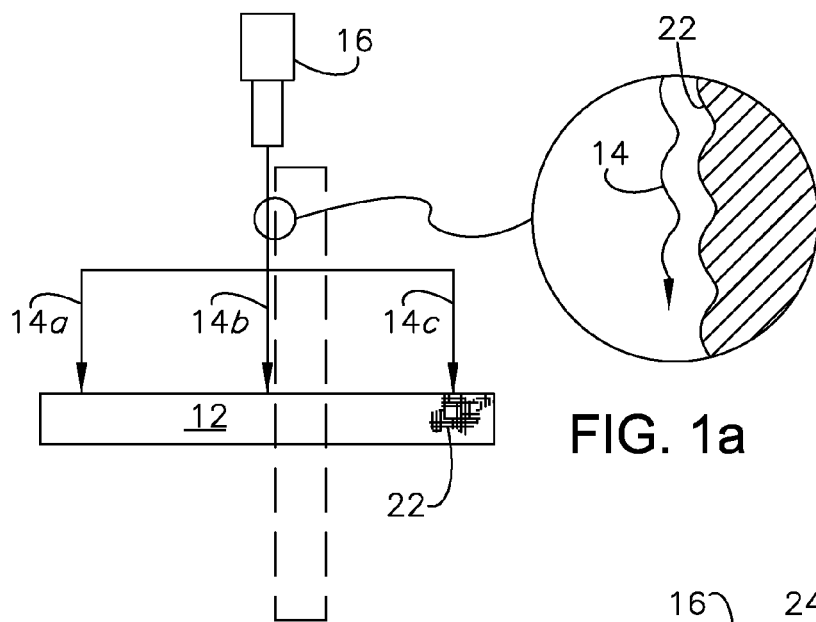
FIG. 1a is an elevation of the assembly shown in FIG. 1, wherein the transmission is multiple laser beams split from a single laser, in accordance with a preferred embodiment of the invention.

In this configuration, the receptive element 18 may be structural configurations defined by the surface 12a, and operable to promote heat absorption by the actuator 12 (FIG. 1a). Where micro-features are defined, the element 18 may be harmonized with the phase and/or frequency of the beam 14, and more preferably, may be created thereby. For example, two or more beams of a high-power pulsed Nd:YAG laser 16 may be used to generate a two-dimensional interference pattern. With a suitable interference pattern, the topography and the phase micro-structure of the shape memory alloy actuator 12 may be coordinated to promote heating. In another example, the receptive element 18 may further include a photovoltaic fluid (FIG. 2) or cell, or a pyrotechnic coating (FIG. 1) that releases enough thermal energy to transform the actuator 12, upon engaging the laser beam 14. Moreover, it is appreciated that other suitable receptive elements 18 for improving absorption of laser light may be used, including graphite applied as an aerosol spay, black paint, and certain oxides/phosphates applied in aqueous bath.

Figure 1B:
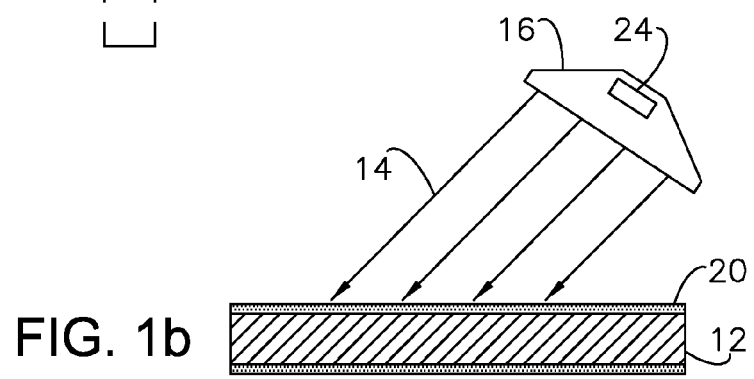
FIG. 1b is an elevation of the assembly shown in FIG. 1, wherein the transmission is microwave radiation, and the assembly further includes an attenuator, in accordance with a preferred embodiment of the invention.
Figure 2:
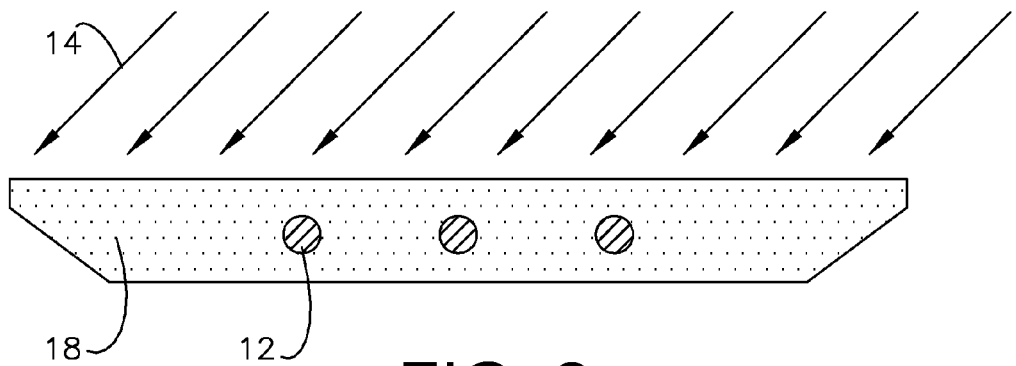
FIG. 2 is an elevation of an actuation assembly comprising a thermally activated active material actuator disposed within a bath further comprising a receptive element, wherein the element engages a wireless transmission, in accordance with a preferred embodiment of the invention.

In other embodiments, energy from the transmission 14 is directly converted into the activation signal, and autonomously delivered to the actuator 12 through radiation, convection, or conduction. For example, and as previously mentioned, where the transmission is microwave radiation, the inventive assembly 10 contemplates using an appropriate receptive element 18 that is thermally coupled to the actuator 12, and a proper wave guide/attenuator 24 (FIG. 1b) operable to direct the microwave transmission 14 thereto. For example, the assembly 10 may comprise a receptive element 18 consisting of a layer 20 of foil wrap, and an SMA wire 12 enveloped by the wrap 20. Here, it is appreciated that the microwave transmission 14 will rapidly heat up the wrap 20, causing the wrap 20 activate the wire 12 through conduction.

Moreover, where the transmission 14 is insufficient thermal radiation, the receptive element 18 may include pyrotechnic or pyroelectric material, again in a layer or coating 20. Alternatively, and as described in the '861 application, the receptive element 18 may compose a panel in direct contact with the actuator 12, wherein the panel is operable to convert solar thermal radiation into an exothermic reaction (pyrotechnic), or an electric current (pyroelectric) sufficient to generate the activation signal.

Alternatively, the transmission 14 may be configured to produce the activation signal by vibrating the receptive element 18. Where the transmission 14 includes a radio wave, for example, the element 18 may compose a ceramic coating or layer 20 receptive to the frequency of the wave 14. Here, the assembly 10 is configured, such that the ceramic 18 is caused to vibrate as a result of engaging the transmission 14. Through vibration, heat energy is generated and an activation signal is delivered to the adjacent actuator 12.

In another alternative, the assembly 10 may be configured to cause an exothermic reaction that releases heat energy proximate to the actuator 12. Where the transmission 14 is ultra-violet radiation, for example, the receptive element 18 may be an organic acid (FIG. 2) having a shiftable PH-value when exposed to ultra-violet radiation. Once shifted to the higher PH-value the acid 18 may be used directly in the reaction, or may serve as a catalyst. Conversely, it is appreciated that the stronger acid 18 may be used to drive an endothermic reaction (one that cools) to deactivate a system. The stronger acid 18 may also be used to create a change in the electrical conductivity of a coating 20 or bath, so as to allow the conveyance of an electrical signal to drive activation.

Figure 3:
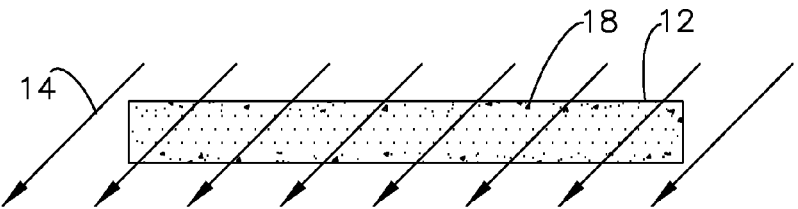
FIG. 3 is an elevation of an actuation assembly comprising a thermally activated active material actuator and receptive element consisting of a plurality of particles embedded within or molecular additives added to the actuator, wherein the element engages a wireless transmission, in accordance with a preferred embodiment of the invention.

Finally, in yet another example of converting the wireless transmission 14 into the activation signal, the receptive element 18 may present a plurality of multi-walled carbon nanotubes impregnated within the actuator 12, and more preferably within the upper layer of actuator 12 (FIG. 3). It is appreciated that the nanotubes 18 are receptive to infrared radiation 14, and are able to absorb the radiation and dissipate it as heat energy. In a particular embodiment, a composite comprising (1-10-25% w/w) of multi-walled carbon nanotubes 18 may be uniformly dispersed in a polyurethane-based thermoplastic SMP matrix. Such a composite, it is appreciated, would be susceptible to direct thermal activation (e.g. using a heat gun) in the normal sense, but also to infrared irradiation, wherein the wavelength is between 660 and 1000 nm, and joule heating (due to the electro-conductivity of the nanotubes). An exemplary SMP is formed of a semi-crystalline (weak ordered) hard segment having a transition temperature of approximately 150° C., and a soft segment that exhibits stress-induced crystallization with a transition temperature of approximately 48° C. The carbon nanotubes 18 act as strain concentrators that promote stress induced crystallization, and improve the modulus, recovery stress, and $R_r$. Finally, it is appreciated that a 2.9% v/v (i.e., 5% w/w) increase in carbon nanotube content increases $R_f$ from 0.56 to 0.7 and the constrained recovery stress from 0.6 to 1.4 MPa as compared to the base polymer 12.

Figure 5:
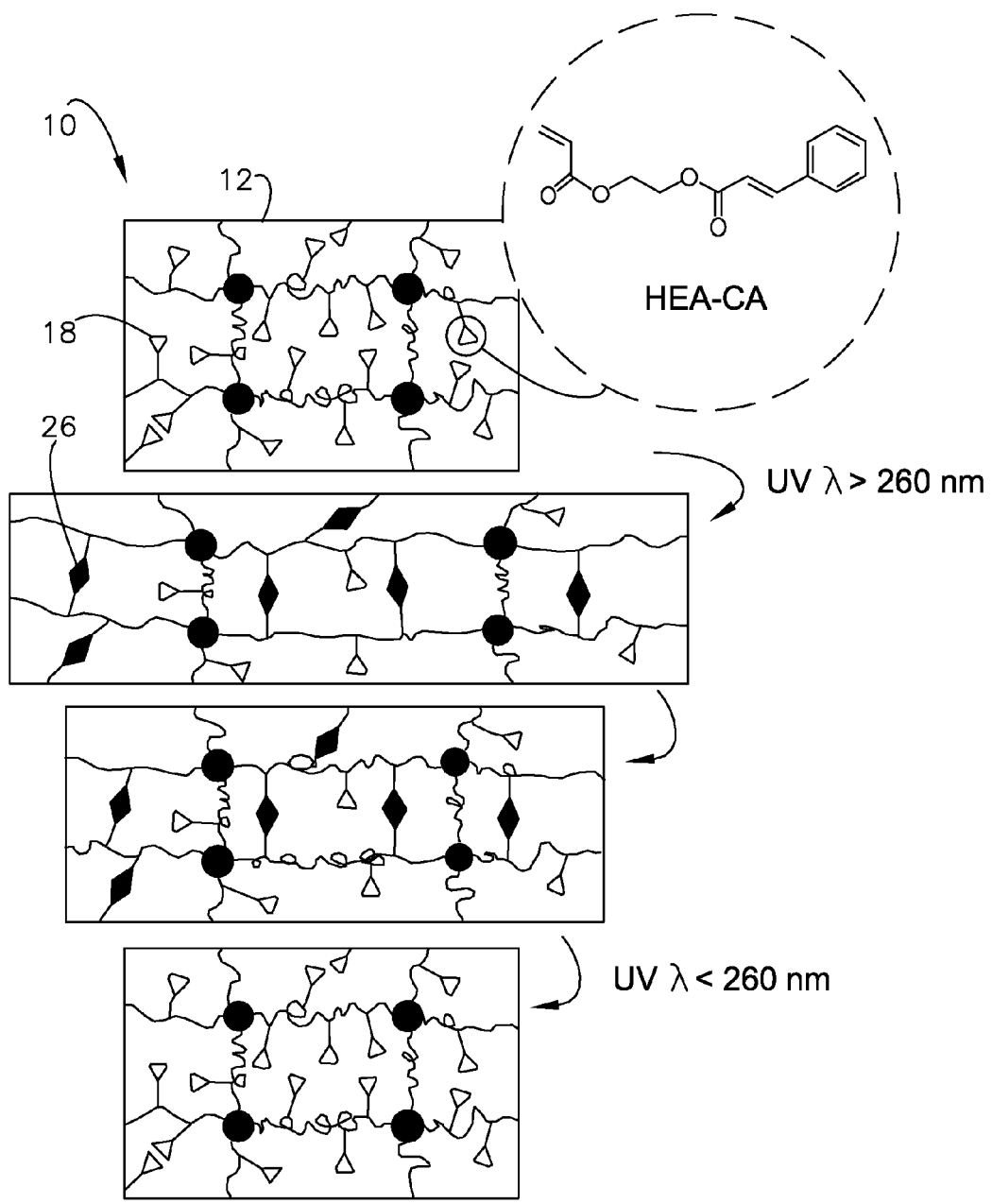
FIG. 5 is a progression of an actuation assembly comprising an SMP matrix further comprising a plurality of covalent bond molecular switches, undergoing a photo-switching effect, in accordance with a preferred embodiment of the invention.

Similarly, where the actuator 12 is formed of a photo-responsive thermoset shape memory polymer matrix, and the transmission 14 is ultra-violet radiation having a radiated wavelength, $\lambda$, the receptive element 18 may include a plurality of photo-responsive molecular switches composing the matrix and operable to simulate thermal activation (FIGS. 3 and 5). A suitable switch 18 is presented by a cinnimic acid (CA) grafted upon a polymer backbone that forms a molecular additive to the matrix. When $\lambda$ is greater than a threshold wavelength (e.g., 260 nm) covalent crosslinks 26 are caused to form among the switches 18; and when $\lambda$ is less than the threshold wavelength the crosslinks 26 are ceased (FIG. 5). As a result, the actuator 12 undergoes an activation-like transformation, due to the increased role of the soft segment within the matrix during crosslink formation. In a particular example, the matrix may consist of n-butylacrylate, hydroxyethyl methacrylate and ethylene glycol 1 acrylate 2 CA (HEA-CA), which are copolymerized and cross-linked by poly(propylene glycol) dimethacrylate.

FIG. 5 shows a progression of the photo-switching effect, wherein the matrix is stretched after exposing it to UV radiation having a $\lambda$ greater than 260 nm. Next, the external stress is removed allowing the actuator-receptive element matrix to recover a portion of the strain; and finally, the matrix is exposed to UV radiation having a $\lambda$ less than 260 nm during a photo-cleaving step, which allows the actuator 12 to recover the remaining strain and return to its higher modulus state.

Figure 4:
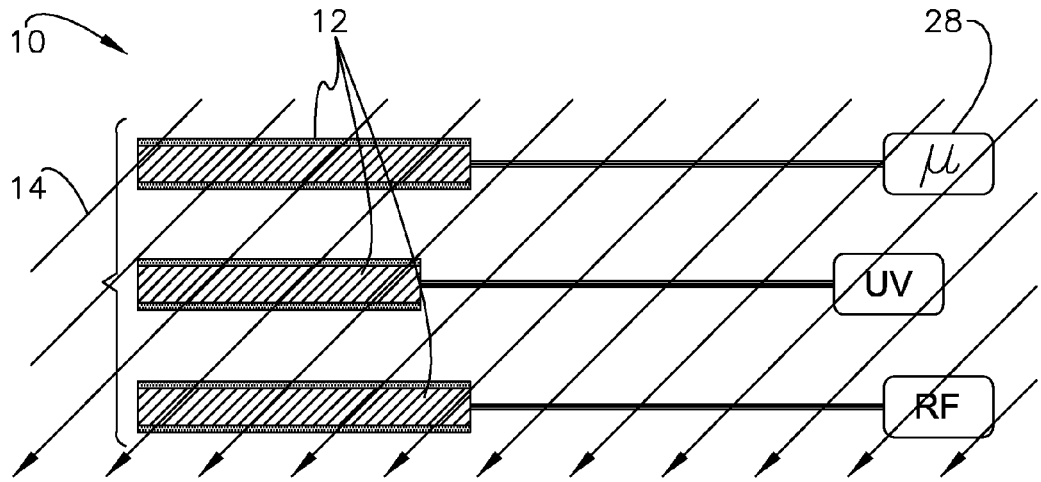
FIG. 4 is an elevation of an actuation assembly comprising a plurality of thermally activated active material actuators and receptive elements composing an external layer or coating, and each drivenly coupled to a tab bearing indicia, in accordance with a preferred embodiment of the invention.

In a preferred embodiment, two or more of the aforementioned assemblies 10 may be combined to enable actuation by multiple types of transmissions 14 (FIG. 4). For example, where adapted for use as a monitor, or gauge, the assembly 10 may comprise a plurality of SMA wires 12, each drivenly coupled to an indicator tab 28 bearing indicia, and communicatively coupled to a coating/layer 20 of a different receptive element 18 operable to effect activation of the associated wire 12, only when engaging one of multiple types of transmissions 14 (e.g., radio, laser, and microwave). Moreover, it is appreciated that different receptive elements 18 may be coated on the same wire 12 such that different areas thereof will respond to the different transmission types in varying identifiable degrees.

This invention has been described with reference to exemplary embodiments; it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

The terms "a" and "an" herein do not denote a limitation of quantity, but rather denote the presence of at least one of the referenced item. The suffix "(s)" as used herein is intended to include both the singular and the plural of the term that it modifies, thereby including one or more of that term. Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

What is claimed is:

1. A method of activating a thermally actuated active material actuator defining an external surface, said method comprising the steps of:
    a. producing a wireless transmission, wherein the wireless transmission is selected from the group consisting of X-rays, microwaves, infrared radiation, ultra-violet radiation, visible light, laser, radio waves, and sound waves;
    b. engaging a receptive element with the transmission, wherein the element is communicatively coupled to the actuator;
    c. modifying the element as a result of engagement with the transmission, wherein modifying the element directly produces a heat energy activation signal in the element by converting the transmission into the heat energy activation signal; and
    d. exposing the actuator to the heat energy activation signal.

2. The method as claimed in claim 1, wherein step a) further includes the steps of selectively producing the transmission on-demand.

3. The method as claimed in claim 1, wherein the transmission is omni-directional.

4. The method as claimed in claim 1, wherein the element is selected from the group consisting of a coating applied to the surface, a surface treatment, an external layer adjacent the surface, a fluid, a plurality of particles impregnated within the actuator, and a molecular additive.

5. The method as claimed in claim 1, wherein the element includes a pyrotechnic or pyroelectric material.

6. A method of activating a thermally actuated active material actuator defining an external surface, said method comprising the steps of:
    a. producing a wireless transmission;
    b. engaging a receptive element with the transmission, wherein the element is communicatively coupled to the actuator;
    c. modifying the element as a result of engagement with the transmission; and
    d. exposing the actuator to a heat energy activation signal or directly producing the signal, as a result of modifying the element;
    wherein the element forms an external layer adjacent the surface, and includes a chromogenic material selected from the group consisting of photochromic, thermochromic, electrochromic, halochromic materials, and steps c) and d) further include the steps of modifying the color of the layer, so as to selectively enable exposure to the signal.

7. The method as claimed in claim 1, wherein the element forms an external layer adjacent the surface, and presents an emissivity shiftable between first and second values, and step c) further includes the steps of shifting the emissivity as a result of engaging the element with the transmission.

8. The method as claimed in claim 1, wherein the transmission includes a radio wave, the element includes a ceramic, and step c) further includes the steps of causing the ceramic to vibrate as a result of engaging the element with the transmission.

9. A method of activating a thermally actuated material actuator defining an external surface, said method comprising the steps of:
   a. producing a wireless transmission;
   b. engaging a receptive element with the transmission, wherein the element is communicatively coupled to the actuator;
   c. modifying the element as a result of engagement with the transmission; and
   d. exposing the actuator to a heat energy activation signal or directly producing the signal, as a result of modifying the element;
   wherein the transmission includes ultra-violet radiation, the element is an acid bath having a shiftable PH-value when exposed to ultra-violet radiation, and step c) further includes the steps of increasing the ph-value of the acid as a result of engaging the element with the transmission.

10. A method of activating a thermally actuated active material actuator defining an external surface, said method comprising the steps of:
    a. producing a wireless transmission;
    b. engaging a receptive element with the transmission, wherein the element is communicatively coupled to the actuator;
    c. modifying the element as a result of engagement with the transmission; and
    d. exposing the actuator to a heat energy activation signal or directly producing the signal, as a result of modifying the element;
    wherein the actuator comprises a thermoset shape memory polymer matrix, the transmission includes ultra-violet radiation having a radiated wavelength, the element includes a plurality of photo-responsive molecular switches further comprising cinnimic acid grafted upon a polymer backbone, and embedded within the matrix, and steps c) and d) further includes the steps of causing covalent crosslink formation as a result of engaging the element with the transmission, only when the radiated wavelength is greater than a threshold wavelength.

11. The method as claimed in claim 1, wherein the transmission is a laser beam.

12. The method as claimed in claim 11, wherein the beam is split, so as to engage the actuator at more than one location.

13. The method as claimed in claim 1, wherein the element contacts the actuator and step d) further includes the steps of heating the actuator through conduction.

14. The method as claimed in claim 1, wherein the transmission is infrared radiation, the element presents a plurality of carbon nanotubes disposed within the actuator, and step c) further includes the steps of using the nanotubes to absorb the radiation and dissipate heat energy.

15. An actuation assembly adapted for selective activation by a wireless transmission selected from the group consisting of X-rays, microwaves, infrared radiation, ultra-violet radiation, visible light, radio waves, and sound waves, said actuator comprising:
    an active material actuator operable to undergo a change in fundamental property when exposed to or occluded from a thermal activation signal, and defining an external surface; and
    a receptive element operable to receive the transmission remotely and to convert the transmission into the thermal activation signal, shiftable between first and second conditions, communicatively coupled to the active material element, operable to enable or cause the active material element to be exposed to the signal, in only one of the first and second conditions, and configured so as to be caused to shift between the first and second conditions when engaged with the transmission.

16. The assembly as claimed in claim 15, wherein the active material is a shape memory alloy, shape memory ceramic, paraffin wax, or shape memory polymer.

17. The assembly as claimed in claim 15, wherein the element is selected from the group consisting of a coating applied to the surface, a surface treatment, an external layer adjacent the surface, a fluid composition within which the material is dispersed, a plurality of particles impregnated within the actuator, and a molecular additive.

18. The assembly as claimed in claim 15, wherein the element forms a coating upon the surface, and is selected from a group consisting of graphite, black paint, oxides, phosphates, and chromogenic material.

* * * * *